United States Patent [19]

Lahalih

[11] Patent Number: 5,094,762
[45] Date of Patent: Mar. 10, 1992

[54] MUD DRILLING FLUIDS, ADDITIVES AND PROCESS FOR MAKING THE SAME

[76] Inventor: Shawqui M. Lahalih, P.O. Box 5114, Doha, Quatar, Kuwait

[21] Appl. No.: 520,823

[22] Filed: May 9, 1990

[51] Int. Cl.$^5$ ............................................... C09K 7/02
[52] U.S. Cl. ................................. 507/117; 528/399; 528/259; 528/261; 507/103; 507/128; 507/130; 507/131
[58] Field of Search .............. 252/8.51, 8.513, 8.514; 528/399, 261, 259

[56] References Cited

U.S. PATENT DOCUMENTS

| | | | |
|---|---|---|---|
| 1,940,383 | 12/1933 | Woodstock | 528/399 |
| 2,639,274 | 5/1953 | Salathiel | 252/8.51 X |
| 2,841,611 | 7/1958 | Bersworth | 562/14 |
| 2,851,442 | 9/1958 | Michaud | 528/261 |
| 2,935,473 | 5/1960 | King et al. | 252/8.51 |
| 3,562,169 | 2/1971 | Prentice | 252/545 |
| 3,621,081 | 11/1971 | Prentice | 558/155 |
| 3,792,084 | 2/1974 | Quinlan | 562/14 |
| 3,872,018 | 3/1975 | Alexander | 252/8.511 |
| 3,956,140 | 5/1976 | Nahm et al. | 252/8.51 |
| 3,975,560 | 8/1976 | Daigle et al. | 427/341 |
| 4,013,599 | 3/1977 | Strauss et al. | 252/3 X |
| 4,035,412 | 7/1977 | Quinlan | 562/14 |
| 4,051,110 | 9/1977 | Quinlan | 528/244 |
| 4,284,759 | 8/1981 | Henbest et al. | 528/261 |
| 4,322,300 | 3/1982 | Holmquist | 252/8.513 |
| 4,322,301 | 3/1982 | Blackmore | 252/8.511 |
| 4,404,108 | 9/1983 | Cates | 252/8.51 |
| 4,447,339 | 5/1984 | Detroit | 252/8.511 |
| 4,457,853 | 7/1984 | Detroit | 252/8.511 |
| 4,473,480 | 9/1984 | Green et al. | 252/8.511 |
| 4,505,825 | 3/1985 | Detroit | 252/8.513 |
| 4,519,923 | 5/1985 | Hori et al. | 252/8.51 |
| 4,521,578 | 6/1985 | Chen et al. | 526/288 |
| 4,618,434 | 10/1986 | Blouin | 252/8.51 |
| 4,663,239 | 5/1987 | Pearson | 428/524 |
| 4,839,095 | 6/1989 | Lahalih et al. | 252/8.514 |
| 4,960,856 | 10/1990 | Formaini | 528/256 |
| 4,968,773 | 11/1990 | Whiteside | 528/230 |

FOREIGN PATENT DOCUMENTS 1230121  4/1971  United Kingdom .

*Primary Examiner*—Robert L. Stoll
*Assistant Examiner*—Chhaya Sayala
*Attorney, Agent, or Firm*—Bacon & Thomas

[57] ABSTRACT

A drilling fluid includes water, bentonite, a weighting agent, and an additive comprising a water-soluble polycondensate containing phosphorous and nitrogen such as phosphorylated-urea-formaldehyde or phosphorylated-melamine-formaldehyde. Such additives provide the desired rheological and filtration loss properties as well as thermal and shear stability. The additives are prepared by reacting phosphorous acid, urea and formaldehyde according to a Mannich-type reaction.

5 Claims, No Drawings

MUD DRILLING FLUIDS, ADDITIVES AND PROCESS FOR MAKING THE SAME

BACKGROUND OF THE INVENTION

The present invention relates to well servicing fluids and additives which include a water soluble polycondensate containing phosphorous and nitrogen and to a process for making the same; and more particularly to such fluids and additives which contain or comprise a water-soluble polycondensate of a phosphomethylated amine aldehyde.

In well drilling, a drilling fluid servicing fluid or mud is pumped down through the drill stem of the rotary rig, circulated around the drill bit and returned to the surface through the annular passage between the drill stem and the well wall. The drilling fluid lubricates the drill stem and bit, cools the bit and carries the cuttings from the bit up to the surface. The drilling fluid also provides a hydrostatic head against the walls of the well to contain downhole geo-pressure.

Typical drilling fluids contain a number of additives, each satisfying a specific purpose. For example, additives are used to control the rheology of the fluid, to improve its filtration properties and/or increase its density. Notwithstanding the cost associated with such additives, the overall cost of the drilling operation is decreased by the improvement made by these additives on the drilling rate and hole-cleaning processes.

In drilling for oil or gas, there are generally three zones that require different drilling fluid characteristics. The first zone extends from 0 to 5000 feet, while the second and third zones range from 5000 to 7000 feet and greater than 7000 feet, respectively. During the initial stage of drilling, i.e., the first zone of the well, a relatively large bore hole is usually desired. In other words, a relatively large quantity of drill cuttings must be moved to the surface. This requires a well servicing fluid with excellent capacity as indicated by a high yield point which ranges from 20 to 30 pounds per 100 square feet and a plastic viscosity of 3 to 6 centipoise.

As the drilling operation gets deeper, smaller bore holes are drilled, resulting in smaller amounts of cuttings. However, the drilling fluid travels longer distances under higher pressure and is subjected to higher temperature.

The additives for the first zone are usually referred to as viscosifiers while the additives for the second and third zones are typically referred to as thinners or dispersants. The second and third zone drilling fluids must have relatively high yield point to viscosity ratio in the range of about 0.6:1.20 and must be very stable to shear and thermal stresses, because of the longer distances under higher pressure and higher temperatures in these two zones.

During these drilling operations, the drilling fluid is monitored and adjusted to obtain the desired characteristics at various depths and under varying conditions. For example, there are three fluid properties which are monitored. These properties are viscosity, yield point and fluid loss. And in general, it is desirable to maintain these properties constant over the longest possible duration. It is also desirable to use additives which are compatible with other materials in the drilling fluid, to use thermally stable non-toxic additives, to avoid excessive usage and to prevent environmental pollution.

Dispersants (thinning agents) are materials that are usually added to reduce resistance to flow and to impede the development of a gel structure. These materials have a relatively large anionic component which is adsorbed on a positive edge site of clay particle thus reducing attractive forces between the particles and resulting in a dispersion action. Generally, improved dispersion leads to reduced filtration. Examples of dispersants include polyphosphates, tannins, lignins, lignosulfonates, etc.

A wide variety of drilling fluids have been used. For example, clay based drilling fluids have been used for cooling and particle removal. In fact, the U.S. patent to Hori, U.S. Pat. No. 4,519,923, discloses the use of sodium carboxymethyl cellulose as a water loss reducing agent to be included in drilling mud. Hori also discloses the use of sulfoethylcellulose alkali metal salts as a water loss reducing agent.

In addition, the U.S. patent of Alexander, U.S. Pat. No. 3,872,018, discloses a "fluid loss" control at temperatures over 300° F. (149° C.) in clay-free seawater mud by the addition of polyvinyl alcohol with starch and that urea with the polyvinyl alcohol further increases temperature stability. As stated in that patent 2 to about 10 pounds per barrel of polyvinyl alcohol is sufficient. And, the average molecular weight of the polyvinyl alcohol ranges from at least about 170,000 to over 200,000.

Another approach for a high temperature stable fluid low control system is disclosed by Green, U.S. Pat. No. 4,473,480. Green discloses a combination of (a) silicate or alumina silicate material; (b) a chemical compound capable of converting to a higher oxidation state under alkaline conditions; and (c) a reaction product formed between a polymeric material selected from polyvinyl alcohol or hydroxyalkyl cellulose and a cross linking agent. Green discloses reacting a polyvinyl alcohol having an average molecular weight of between 90,000 to 200,000 with an aldehyde such as formaldehyde or melamine formaldehyde.

Lignosulfonate is a commonly used additive of this group of chemicals. Several patents disclose the modification of lignosulfonates (LS) to improve their thermal stability or thinning ability (Detroit, U.S. Pat. No. 4,447,339, and Chen et al., U.S. Pat. No. 4,521,578). According to an article [Lauzon, R. V. Oil Gas J. 80,93 (1982)] this improvement can be realized if the hydroxyl group of a lignosulfonate is oxidized to a carboxylic group. The presence of the weak acid (carboxylic) group and strong acid (sulfate) group leads to more repulsion and increased dispersion of the clay particles which adsorb the lignosulfonate chains.

Another approach to improve the thermal stability of lignosulfonate is disclosed by Blackmore, U.S. Pat. No. 4,322,301, where he grafted lignosulfonate and acrylic acid or derivatives thereof to which a phosphate or a particular metal or both were added. The use of heavy metal salts of lignosulfonates wherein the metals are chromium, aluminum, iron, copper, or combinations thereof, has been disclosed in U.S. Pat. No. 2,935,473 to improve the thermal stability of drilling fluids. While the thermal stability of these additives, especially the chromium salt and the grafted copolymer of lignosulfonate with acrylic acid in the presence of metal or phosphate, has been sufficient in some cases, they are unstable in deeper wells where the temperatures are very high. The filtration loss of fluids also increases at these depths.

Another class of thinning agents have been reported in U.S. Pat. No. 3,956,140 where sulfonated phenol-formaldehyde resins were used. Reacting urea with the sulfonated phenol-formaldehyde was effective in heat stabilizing the drilling fluid while reacting melamine with the same resin improved the filtration properties of the fluid.

The use of sulfonated amino aldehyde resins as drilling mud additives is disclosed by Lahalih et al., U.S. Pat. No. 4,839,095. As reported therein, thermal stability is achieved by the use of sulfonated urea formaldehyde while filtration properties are improved by the use of sulfonated melamine formaldehyde. However, neither sulfonated urea formaldehyde nor sulfonated melamine formaldehyde improve both thermal stability and filtration properties simultaneously. For example, when sulfonated urea formaldehyde is used, filtration losses of the drilling fluid are high while thermal stability is acceptable and when sulfonated melamine formaldehyde is used filtration losses are reduced significantly, but the yield point and thermal stability suffer.

Therefore, it is the object of the present invention to provide improved well servicing fluids and additives for controlling the rheology of the fluid, improving its filtration properties and increasing its density without adversely affecting the overall costs of the drilling operations. It is a further object of the invention to provide well servicing fluids and additives with improved thermal stability and which are stable when subjected to high shear stresses under high pressure. It is also an object of the invention to provide a process for making such fluids and additives.

SUMMARY OF THE INVENTION

It has now been found that water-soluble polycondensates containing phosphorous and nitrogen may be added to water, bentonite and a weighting agent such as barite to produce an improved well servicing fluid. For example, additives comprising a water-soluble polycondensate of a phosphomethylated amine aldehyde such as phosphorylated-urea-formaldehyde or phosphorylated-melamine formaldehyde have been found to improve both thermal stability and filtration properties.

In a preferred embodiment of the invention, a well servicing fluid includes a mixture of brackish water having total dissolved solids in the range of 500 to 5000 parts per million, bentonite in an amount of 15 to about 30 pounds per barrel, weighting agent in an amount of between 1 to 3 pounds per barrel and an additive such as phosphorylated-urea-formaldehyde, phosphorylated-melamine-formaldehyde or mixtures thereof in an amount of 0.1 to 10 pounds per barrel. In general, the phosphorylated-urea-formaldehyde is preferred because of its lower cost.

The additives in accordance with the present invention may be prepared by a Mannich-type reaction. For example, the additives may be prepared by dissolving from about 5.2 grams to 240.5 grams (0.0625 to 3 moles) of a material selected from phosphorous acid, sodium dihydrogen orthophosphate, ammonium dihydrogen orthophosphate, diammonium hydrogen orthophosphate, phosphorous pentaoxide, phosphoric acid and mixtures thereof in water and adding from 9.13 grams to 109.5 grams (0.25 to 3.0 moles) of 37% concentrated hydrochloric acid. At times, it is possible to replace the hydrochloric acid with acetic acid in an amount of 1.25 to 3.35 moles for each half mole of urea which is subsequently added. In a preferred process, a solution of the above is formed with a pH of between +0.3 and −1.0 and heated to a temperature of about 100° C. to about 110° C. and refluxed at that temperature for about 15 to about 30 minutes.

The above solution is maintained within the stated temperature range and between 15 grams to 252 grams (0.25 to 2.0 moles) of urea, melamine or mixtures thereof are added and the refluxing continued within the aforementioned range for about 15 to 30 minutes. In a preferred process, between 15 grams to 120 grams of urea are added.

After dissolving 31.25 grams to 125 grams (1.0 to 4.0 moles) of 96% paraformaldehyde in water, the resulting solution is added to the refluxed solution described above and the mixture of the two solutions is refluxed at the same temperature for 30 to 180 minutes.

Finally, the pH of the solution was adjusted to about 8 to about 10 by the addition of sodium hydroxide and the solution filtered to obtain an additive with a viscosity of between 1.5 and 13 centipoise (cP) when measured at 25° C., and a solid content of between 20% to 55%.

DETAILED DESCRIPTION OF THE PREFERRED EMBODIMENT

The present invention is directed to compositions for use in well drilling and to compositions which have improved thermal stability and filtration properties. The present invention is also directed to novel additives for controlling the rheological characteristics of a drilling fluid and to a method for making such additives.

It has now been found that water-soluble resins which contain phosphorous and nitrogen can be used effectively to provide the rheological and filtration loss properties of a drilling mud. In addition, these resins are very stable and out perform commercial products. The resins, according to the present invention, are particularly applicable as thinners, filtration-control agents and at high temperatures in view of their thermal stability.

The novel additives or water-soluble resins according to the present invention may be prepared by reacting urea with phosphorous acid and formaldehyde at reflux temperature in the presence of hydrochloric acid or acetic acid according to a Mannich-type reaction. The products, for example, may be prepared according to two procedures. According to a first procedure, urea is added to an already prepared solution consisting of phosphorous acid, hydrochloric acid or acetic acid and water which has been heated to reflux. The mixture is kept at reflux for fifteen minutes, then a formaline solution which has been prepared a priori is added at reflux to the reaction mixture in a drop-wise manner in the course of one hour. After the addition of formaline, the solution is then allowed to react at reflux for 30 to 180 minutes.

As an alternative, and in accordance with a second procedure, a formaline solution is prepared by adding a desired weight of 96% paraformaldehyde to water and allowing the reaction to continue at 60° C. for 15 to 30 minutes. Hydrochloric acid or acetic acid is then added at reflux and the reaction continued for 15 to 90 minutes. Finally, phosphorous acid is added and the reaction continued at reflux for an additional 60 to 180 minutes. In both reaction procedures, the products obtain are at very low pH and the pH of the final solution is raised by 8 to 10 by the addition of concentrated NaOH.

In both of the above procedures, the amounts of reactants are: urea between 0.25 moles to 2 moles, but preferably between 0.33 to 0.50 moles, phosphorous acid between 0.125 to 3 moles, but preferably between 1.25 to 2.5 moles, formaldehyde between 1.0 to 4.0 moles, but preferably between 1.25 moles to 2.5 moles and hydrochloric acid between 0.25 to 3 moles, but preferably between 1.0 to 2.5 moles. However, in the case of acetic acid, the amount of the reactant is between 1.25 moles to 5 moles, but preferably between 3 to 5 moles.

The presently preferred ratio of urea of formaldehyde to phosphorous acid is 0.5:2.0:2.0 and the reaction temperature at reflux is between 100° C. to 110° C. for about 60 minutes to about 180 minutes. However, in a preferred practice, the reaction temperature is maintained for between 60 and 120 minutes. The concentration, i.e., the solid content, of the reaction product is between 20% to 55%, and preferably between 30% to 55% for economical reasons.

The amines used in carrying out the invention may be urea, melamine, polyamines, etc., but preferably urea since it is the most economical. Also, various aldehydes may be used, but formaldehyde is preferred. In addition, acetic acid can be used in place of HCl to provide a low pH acidic reaction medium, but HCl is preferred. Finally, other phosphorous containing compounds can be used, but the most preferable is phosphorous acid.

Examples of other phosphorous containing compounds which may be suitable in carrying out the present invention include: sodium dihydrogen orthophosphate, ammonium dihydrogen orthophosphate, diammonium hydrogen orthophosphate, phosphorous pentaoxide, phosphoric acid and mixtures thereof.

The invention also contemplates the use of sulfonated amino aldehyde resins in the presence of phosphorous acid as drilling mud additives. More specifically, sulfonated urea formaldehyde (SUF) or sulfonated melamine folmaldehyde (SMF) or sulfonated urea-melamine formaldehyde resins can be prepared in accordance with a four procedure outline in U.S. Pat. No. 4,677,159, except that phosphorous acid is used in the third step instead of sulfuric acid to prepare a sulfonated phosphorylated amino aldehyde resin. The disclosure of U.S. Pat. No. 4,677,159 is incorporated herein by reference.

In one embodiment of the invention, 0.4 moles of melamine or urea were added with 160 gm. of water. The formalin solution was prepared by the addition of 0.65 moles of paraformaldehyde to 230 gm of water and heated up to 50° C. at a pH of 10 to 11 and the reaction continued for 15 minutes. The temperature was then raised to 80° C. and 0.20 moles of sodium metabisulfite was added and the reaction continued for an additional 60 minutes. The temperature of the solution was then lowered to 50° C. and the phosphorous acid added (15N) to bring the pH of the solution to about 4 and the reaction continued for another 60 minutes. After that, the pH of the solution was raised to about 8 to 9 by the addition of sodium hydroxide and the reaction continued for 60 minutes.

The drilling mud additives obtained above were found to have several advantages. For example, they were effective thinners when added to drilling mud where they reduced the plastic viscosity and yield point significantly. Second, they were good filtration loss-control agents where water losses were also reduced significantly. Third, these additives were thermally stable when compared to commercial additives. Finally, these additives are non-toxic, relatively inexpensive to produce and could be used as a source of nutrients for plants.

The following examples are presented to further illustrate the present invention. Example 1 illustrates one of the preparation procedures (i.e., procedure I) used in preparing such additives. Example 1 also illustrates the preparation of a basic drilling mud mix and the methods used in evaluation the properties of the mud in accordance with the testing procedure set forth in the "API Recommended Practice, Standard Procedure for Testing Drilling Fluids," 10th Edition, American Petroleum Institute, Dallas, Tex. 1984.

Examples 1 to 9 illustrate the effect of formaldehyde on the properties of these additives and their characteristics in influencing the properties of drilling mud when they are added to it. The results of Examples 1 to 9 are shown in Table 1 and it can be seen that for a low formaldehyde (F) to urea (U) to phosphorous acid (P) ratio (i.e., 1:.5:2, respectively), the filtration loss is high (Examples 1 to 3). Similarly, for high formaldehyde (F) to urea (U) to phosphorous acid (P) (i.e., 4:.5:2), the viscosity of the drilling fluid is high (Examples 7 to 9). However, for F:U:P ratio of 2:0.5:2, an ideal property of drilling mud is obtained where the plastic viscosity, yeild point and filtration loss are optimum as illustrated by Examples 4 to 6 and Table 1. It should be pointed out that this ratio is the same as the stoichiometry of the reaction.

Examples 10 to 12 illustrate the effect of urea concentration in the reaction. It can also be seen from Table 1 that F:U P ratio of 1:1:1 (Example 12) is not recommended since it leads to high filtration loss and high plastic viscosity and yield point of the treated drilling fluid. Again, an ideal ratio of F:U:P of 2:0.5:2 is preferred.

Examples 13 to 20 illustrate the effect of phosphorous acid concentration in the reaction. Table 1 shows that filtration loss decreases as phosphorous acid concentration increases and reaches a plateau between 1 and 1.5 moles of phosphorous acid where F:U:P is 2:0.33:(1-1.5) which is approximately in agreement of the idea ratio mentioned above of 2:0.5:2.

Examples 21 to 24 illustrate the effect of sodium metabisulfite on the properties of these additives. Table 1 shows that as the sodium metabisulfite concentration increases, the rheological properties (i.e., plastic viscosity and yield point) decreases and the filtration loss increases.

The effect of HCl concentration in the reaction on the behavior of these additives as thinners is illustrates in Examples 25 to 27. Table 1 shows that an effective amount of HCl is present to produce additives that are effective thinners. For examples, when 25 ml of 37% HCl is used (Example 25) high rheological properties and higher filtration loss occurs with the treated drilling mud. Properties of the drilling fluid seem to plateau when larger amounts are used, namely 75 ml of 37% HCl and 200 ml (Examples 26 and 27). It is thought that higher concentration of HCl provides a low pH of the reaction mixture which speeds up the Mannich type reaction and prevents oxidation of the phosphites to phosphates.

Examples 28 to 31 show the effect of reaction time after the complete addition of the formaldehyde to the reaction mixture. Table 1 shows that reaction time of thirty minutes or less under the circumstances was not enough to produce an drilling mud additive with the desired properties as illustrated by Example 28 and Table 1, where filtration is high. On the other hand, a long reaction time of 180 minutes produces products that are also not as effective as drilling mud thinners where filtration loss is high and the rheological properties of the treated drilling mud is also high (Example 31). Thus, a reaction time of 60 to 120 minutes appears to produce good drilling mud additives (Examples 29 and 30). This indicates that probably low and very high molecular weight products are not effective drilling mud thinners and only products of intermediate molecular weight are more effective. For example, the additives according to a preferred embodiment of the invention have been found to have an apparent weight average molecular weight of between 500 and 2500 and a molecular weight distribution between 7.2 and 11.1. The molecular weights were measured by GPC (Gel Permeation Chromatography) technique using μ-Bondagel linear columns. The solvent used is deionized water at a flow rate of 0.5 ml/minute. Calibration is done using sodium polystyrene sulfonate and the injection volume is 100 μl of 1% solution.

The effect of reaction temperature was also investigated and the results are illustrated in Examples 32 to 35 and Table 1. The results show that as the reaction temperature increases, the viscosity of the products increases significantly, indicating an increase in the average molecular weight of these products. However, there does not seem to be a major influence on the effect of these products on the properties of treated drilling mud except a slight improvement of filtration loss was noticed.

The order of addition of the various reactants in preparing urea formaldehyde resins was also investigated and they are illustrated in Examples 36 to 41 and Examples 4 to 9 in Table 2. Table 2 shows the effect of reaction procedure on the properties in these products and their consequent effect on the properties of drilling mud treated with 3 ppb of these additives. Table 2 shows that procedure I is more effective in producing products that are more effective as thinners as illustrated in Examples 4 to 9, compared to products produced using procedure II (Examples 36 to 41). In procedure I urea is added to a solution of phosphorous acid and HCl at reflux followed by the addition of formaldehyde drop-wise in the course of one hour and the reaction is then allowed to proceed at reflux for 0.5 hour to 3 hours. Procedure II, on the other hand, adds urea to a formaline solution and HCl at reflux followed by the addition of phosphorous acid and the reaction is then allowed to continue for one to three hours.

The effect of application does of these additives on the properties of drilling mud as compared to a commercial product is illustrated in Table 3. The data shows that the properties of the drilling mud treated with these additives was not as sensitive to dose as when it was treated with commerical product, namely "Spersene." In fact, Example 27, Table 3, shows that a change in filtration loss of 2.4% (i.e., from 8.2 ml to 8.0 ml) when a dose of 1 ppb and 5 ppb are used, respectively, compared to the commercial additive "Spersene" where a change of 28.1% (i.e., from 8.9 to 6.4) when a dose of 1 ppb and 5 ppb are used, respectively.

One of the advantages of the additives prepared, according to the present invention, is their thermal stability. Table 4 shows the effect of thermal aging on the properties of drilling mud treated with different additives and aged at 350° F. for 24 hours. The samples of Examples 5, 9, 29, 39, 43, 49 and 52 were compared with a commercial additive "Spersene" and another additive that is claimed to be thermally stabilized known commerical as "XP-20" The results of Table 4 show that the drop in the yield point for sample of Example 39 (this work) was 61.9% compared to 95% for commercial "Spersene" and 71.9% for commerical "XP-20." The filtration loss increased by 139%, 258% and 185% for Example 39 (according to the invention), commercial "Spersene" and commercial "XP-20," respectively. This shows clearly the superior performance of the additives prepared according to the present invention under thermal aging which is essential in deep well drilling where high temperatures are encountered.

The effect of phosphorous containing compounds on the properties of drilling mud were also investigated in Examples 44 to 58, and the result are shown in Table 5. Examples 44 to 47 were prepared according to the second procedure described earlier for phosphomethylated urea (i.e., procedure II) where phosphorous acid was replaced by different phosphate compounds like sodium dihydrogen orthophosphate ($NaH_2PO_4$, Example 44), ammonium dihydrogen orthophosphate ($NH_4H_2PO_4$, Example 45), diammonium hydrogen orthophosphate (($NH_4)_2HPO_4$, Example 46), phosphorous pentaoxide ($P_2O_5$, Example 47) and phosphoric acid ($H_3PO_4$, Example 48). The results show that the yield point and the filtration loss of the drilling fluid are very high (Table 5).

Sulfonated melamine formaldehyde (SMF) (Examples 49 to 52) and sulfonated urea melamine formaldehyde (SUMF) (Examples 53 to 56) were physically mixed with various phosphate salts at a level of 3% P (phosphorous) to prepare a drilling mud additive. The results on the rheological properties and filtration loss of a treated drilling fluid are shown in Table 5. The results show that the yield point is very high while the viscosity and the filtration loss are reasonably low compared to the control mix. Phosphorous acid was also reacted with SMF and SUF resins (Examples 57 and 58) instead of just physical mixing at the same level of concentration (i.e., approximately 3% P). The results in Table 5 also show high yield point and high filtration loss of the treated drilling mud with these additives. For comparative purposes, a sample of Example 29 and commercial sample "Spersene" are shown on the same table where the plastic viscosity, yield point and filtration loss are significantly lower than the control and the other samples.

The effect of replacing hydrochloric acid by acetic acid is illustrated in Table 6. It can be seen from Table 6 and Examples 59 to 70 that as reaction time and the amount of acetic acid increase, the effect of these products as thinners also improves. The theological properties and filtration loss are reduced appreciably as mushc as in the case of hydrochloric acid (Examples 16 and 28 to 31.

Examples 71 and Table 7 show the effect of phosphomethylated urea as a soil stabilizer. Although there is an improvement in compressive strength of sand by 10% to 20% when phosphomethylated urea is used, the compressive strength of sand is improved by 80% when sulfonated melamine formaldehyde is used. This indicates the products of this invention are probably less dispersive and are more suited as drilling mud additives than soil stabilizer agents.

Finally, the chemical composition of some selected samples (i.e., Examples 18, 19, 23, 39, 48, 57 and 58) were analyzed and are shown in Table 8. Of special importanct is the percent of phosphorous present in the compositions of this invention range between 7% and 13% while the nitrogen ranges between 1.5% to 5%. Other elements and their percentages are shown in Table 8.

In general the examples show that optimum properties may be obtained by using drilling mud additives based on the reaction of phosphorous acid, urea and formaldehyde in the presence of concentrated hydrochloric acid or acetic acid. The examples also show that certain reaction procedures and conditions provide optimum behavior of the resulting products as effective thinners in drilling mud systems. For example, urea, phosphorous acid and formaldehyde having a preferred ratio of 0.5:2:2, respectively, in the present of 37% HCl of 75 to 200 ml or acetic acid or 200 to 300 ml provide an additive in accordance with a presently preferred embodiment of the invention. The preferred reaction temperature should be greater than 100° C. and preferably between 100° to 110° C. The preferred reaction time after the complete addition of formaldehyde is between one hour and two hours. Also, the concentration of reactants in the resulting solution range between 19% and 55% and their viscosity when measured at 25° C. range between 1.5 to 16 centipoises (cP). Such products, when added to drilling mud, were found to be very stable under high temperature thermal aging of 350° F.

While the examples have been limited to urea and melamine as a representative amine compound, it is obvious that other amines and polyamines can also be used. However, urea is preferred since it is a commodity and relatively inexpensive. Similarly, other aldehydes may be used in place of formaldehyde, but formaldehyde is preferred for these types of products and applications.

EXAMPLES 1-3

A solution of 165.7 gm of 99% phosphorous acid (2 moles), hydrochloric acid (75 ml of 37% concentrated solution) and water (100 ml) were heated up to reflux temperature (approximately 102° C.). The solution heated at reflux for 20 minutes where the pH was ranging from +0.2 to −0.7. 30 gm of urea (0.5 moles) were added to the solution. The reaction continued at reflux temperature for 15 minutes. A formaline solution was prepared by adding 31.25 gm of 96% paraformaldehyde (1 mole of formaldehyde) to 120 ml of water at 60° C. The mixture was heated at 60° C. for 15 minutes. This was then added to the mixture prepared above dropwise in the course of one hour during which the solution temperature was maintained at reflux. The reaction was then allowed to continue at reflux for 60, 120 and 180 minutes. Samples were drawn after each time interval. The pH of the samples were then raised to 8 to 10 by the addition of sodium hydroxide. The viscosity of the samples were measured at 25° C. and the corresponding solid content is determined and are shown in Table 1.

In order to see the effect of these products as thinners or dispersants on a typical drilling mud formulation, the following procedure was adopted for all of the tests.

165 gm of 100% wyoming bentonite is added to 2310 gm of brackish water (total dissolved solids is 3000). 3.2 gm of caustic soda is added to the mixture and the whole mixture is mixed in a blender with high mixing speed for half an hour. The mixture is then left for 24 hours at room temperature to stabilize and for the bentonite to hydrate. After 24 hours, the mixture is then divided into five equal portions each weighing 450 gm. To each portion is added 1.2 gm of high viscosity carboxymethyl cellulose (CMC) and is mixed very well in a blender for five minutes. After that, 132 gm of barite (barium sulfate) is added and the mixture is mixed for another five minutes. One portion is left as control while to each of the other four portions is added 3.6 gm of the additive (thinner) which is equivalent to 3 pounds per barrel (ppb) and the whole mixture is blended for five minutes. The plastic viscosity (PV) and the yield point (YP) are then measured using a standard Fann Viscometer model 35 SA. The plastic viscosity is determined by subtracting the 300 reading from the 600 reading while the yield point is determined by subtracting the plastic viscosity value from the 300 reading. The units of PV is centipoise (cP) while YP is (lb/100 ft$^2$) all measured at room temperature. To measure filtration loss, a low pressure filter press is used at room temperature. The total fluid loss or filtration loss (FL) is measured after the sample is being exposed to a pressure of 100 psi for thirty minutes. The units of filtration is measured in ml. The PV, YP and FL of Examples 1 through 3 are shown in Table 1.

EXAMPLES 4-6

The same procedure of Example 1 was followed except that 2 moles of formaldehyde were used and the reaction continued for 60, 120 and 180 minutes. The viscosity and solid content of the products along with their effect on the plastic viscosity (PV), yield point (YP) and filtration loss (FL) of a drilling mud are shown in Table 1.

EXAMPLES 7-9

The same procedure of Example 1 was followed except that 4 moles of formaldehyde were used and the reaction continued for 60, 120 and 180 minutes. The viscosity and solid content of the products along with their effect on the plastic viscosity (PV), yield point (YP) and filtration loss (FL) of a drilling mud are shown in Table 1.

TABLE 1

The Effect of Various Reactant Ratios and Reaction Conditions on the Products Properties and their Consequent Effect on the Properties of Drilling Mud Treated with 3 ppb of Additives

| Example No. | Lab Sample | Reactants | | | | | Phosphomethylolation | | Product Property | |
|---|---|---|---|---|---|---|---|---|---|---|
| | | Formaldehyde (moles) | Urea (moles) | Phosphorous Acid (moles) | HCl (ml) | Sodium meta bi-sulfite (moles) | Reaction Temp. (°C.) | Reaction Time (min) | Viscosity at 25° C. (cP) | Solid content (%) |
| 0 | Control | — | — | — | — | — | — | — | — | — |
| 1 | 01241 | 1.0 | 0.5 | 2.0 | 75 | 0.0 | 102 | 60 | 5.09 | 32.52 |
| 2 | 01241 | 1.0 | 0.5 | 2.0 | 75 | 0.0 | 102 | 120 | 4.74 | 31.19 |
| 3 | 01241 | 1.0 | 0.5 | 2.0 | 75 | 0.0 | 102 | 180 | 5.52 | 32.9 |
| 4 | 0191 | 2.0 | 0.5 | 2.0 | 75 | 0.0 | 102 | 60 | 4.00 | 27.9 |
| 5 | 0191 | 2.0 | 0.5 | 2.0 | 75 | 0.0 | 102 | 120 | 4.87 | 30.7 |

TABLE 1-continued

The Effect of Various Reactant Ratios and Reaction Conditions on the Products Properties and their Consequent Effect on the Properties of Drilling Mud Treated with 3 ppb of Additives

| | | | | | | | | | | |
|---|---|---|---|---|---|---|---|---|---|---|
| 6 | 0191 | 2.0 | 0.5 | 2.0 | 75 | 0.0 | 102 | 180 | 5.95 | 32.2 |
| 7 | 01101 | 4.0 | 0.5 | 2.0 | 75 | 0.0 | 102 | 60 | 4.42 | 28.1 |
| 8 | 01101 | 4.0 | 0.5 | 2.0 | 75 | 0.0 | 102 | 120 | 5.13 | 31.7 |
| 9 | 01101 | 4.0 | 0.5 | 2.0 | 75 | 0.0 | 102 | 180 | 5.94 | 34.9 |
| 10 | 12181a | 2.0 | 0.33 | 2.0 | 200 | 0.0 | 102 | 60 | 5.72 | 32.0 |
| 11 | 01211c | 2.0 | 0.5 | 2.0 | 200 | 0.0 | 102 | 60 | 5.85 | 34.49 |
| 12 | 01221b | 2.0 | 2.0 | 2.0 | 200 | 0.0 | 102 | 60 | 5.29 | 35.60 |
| 13 | 11192 | 2.0 | 0.33 | 0.00 | 75 | 0.167 | 102 | 60 | 1.82 | 24.0 |
| 14 | 11191 | 2.0 | 0.33 | 0.062 | 75 | 0.167 | 102 | 60 | 1.82 | 19.1 |
| 15 | 11142 | 2.0 | 0.33 | 0.125 | 75 | 0.167 | 102 | 60 | 6.64 | 30.4 |
| 16 | 11141 | 2.0 | 0.33 | 0.250 | 75 | 0.167 | 102 | 60 | 2.69 | 27.3 |
| 17 | 11122 | 2.0 | 0.33 | 0.500 | 75 | 0.167 | 102 | 60 | 3.97 | 33.1 |
| 18 | 1152 | 2.0 | 0.33 | 1.00 | 75 | 0.167 | 102 | 60 | 7.24 | 37.0 |
| 19 | 11201a | 2.0 | 0.33 | 1.00 | 75 | 0.167 | 102 | 60 | 3.60 | 27.66 |
| 20 | 11201b | 2.0 | 0.33 | 1.50 | 75 | 0.167 | 102 | 60 | 4.69 | 30.94 |
| 21 | 11233 | 2.0 | 0.33 | 0.50 | 75 | 0.0 | 102 | 60 | 2.52 | 23.2 |
| 22 | 11222 | 2.0 | 0.33 | 0.50 | 75 | 0.0835 | 102 | 60 | 3.01 | 24.8 |
| 23 | 11122 | 2.0 | 0.33 | 0.50 | 75 | 0.0167 | 102 | 60 | 3.97 | 33.1 |
| 24 | 1171 | 2.0 | 0.33 | 0.50 | 75 | 0.330 | 102 | 60 | 2.47 | 25.6 |
| 25 | 01171 | 2.0 | 0.5 | 2.00 | 25 | 0.0 | 102 | 60 | 4.41 | 29.70 |
| 26 | 0191 | 2.0 | 0.5 | 2.00 | 75 | 0.0 | 102 | 60 | 4.00 | 27.90 |
| 27 | 01181b | 2.0 | 0.5 | 2.00 | 200 | 0.0 | 102 | 60 | 5.11 | 31.14 |
| 28 | 01211 | 2.0 | 0.5 | 2.00 | 200 | 0.0 | 102 | 30 | 4.64 | 31.00 |
| 29 | 01211 | 2.0 | 0.5 | 2.00 | 200 | 0.0 | 102 | 60 | 5.00 | 33.50 |
| 30 | 01211 | 2.0 | 0.5 | 2.00 | 200 | 0.0 | 102 | 120 | 5.85 | 34.50 |
| 31 | 01211 | 2.0 | 0.5 | 2.00 | 200 | 0.0 | 102 | 180 | 5.79 | 36.30 |
| 32 | 01231 | 2.0 | 0.5 | 2.00 | 200 | 0.0 | 102.7 | 30 | 4.87 | 30.80 |
| 33 | 01231 | 2.0 | 0.5 | 2.00 | 200 | 0.0 | 104.5 | 60 | 5.61 | 33.70 |
| 34 | 01231 | 2.0 | 0.5 | 2.00 | 200 | 0.0 | 105.9 | 120 | 8.19 | 39.80 |
| 35 | 01231 | 2.0 | 0.5 | 2.00 | 200 | 0.0 | 107.9 | 180 | 11.87 | 42.80 |

| | | Drilling Mud Properties | | | |
|---|---|---|---|---|---|
| Example No. | Lab Sample | Plastic Viscosity (cP) | Yield Point YP (lb/100 ft2) | Filtration Loss FL (ml) | Special Features |
| 0 | Control | 29 | 40 | 9.5 | Effect of formaldehyde on the properties of drilling mud Examples 1-9 |
| 1 | 01241 | 26 | 24 | 8.6 | |
| 2 | 01241 | 27 | 26 | 8.7 | |
| 3 | 01241 | 24 | 28 | 8.7 | |
| 4 | 0191 | 24 | 24 | 8.2 | |
| 5 | 0191 | 25 | 24 | 8.0 | |
| 6 | 0191 | 24 | 24 | 8.3 | |
| 7 | 01101 | 29 | 22 | 8.2 | |
| 8 | 01101 | 29 | 21 | 8.2 | |
| 9 | 01101 | 29 | 23 | 7.9 | |
| 10 | 12181a | 25 | 25 | 8.4 | Effect of urea on drilling mud properties. Examples 10-12. |
| 11 | 01211c | 27 | 26 | 8.3 | |
| 12 | 01221b | 27 | 29 | 8.9 | |
| 13 | 11192 | 22 | 55 | 11.4 | Effect of phosphorous acid on the properties of drilling mud. Examples 13-20. |
| 14 | 11191 | 23 | 45 | 9.5 | |
| 15 | 11142 | 21 | 26 | 10.1 | |
| 16 | 11141 | 17 | 24 | 9.9 | |
| 17 | 11122 | 24 | 29 | 9.0 | |
| 18 | 1152 | 24 | 29 | 8.2 | |
| 19 | 11201a | 26 | 26 | 8.5 | |
| 20 | 11201b | 25 | 24 | 8.2 | |
| 21 | 11233 | 27 | 19 | 9.0 | Effect of sodium metabisulphite on properties of drilling mud. Examples 21-24. |
| 22 | 11222 | 25 | 18 | 8.5 | |
| 23 | 11122 | 24 | 23 | 9.0 | |
| 24 | 1171 | 22 | 22 | 10.4 | |
| 25 | 01171 | 25 | 27 | 8.6 | Effect of HCl on properties of drilling mud. Examples 25-27. |
| 26 | 0191 | 24 | 24 | 8.2 | |
| 27 | 01181b | 25 | 25 | 8.2 | |
| 28 | 01211 | 26 | 22 | 8.9 | Effect of phospho-methylolation reaction temperature and time on properties of drilling mud. Examples 28-35. |
| 29 | 01211 | 26 | 24 | 7.8 | |
| 30 | 01211 | 27 | 26 | 8.3 | |
| 31 | 01211 | 25 | 26 | 8.7 | |
| 32 | 01231 | 28 | 21 | 8.5 | |

TABLE 1-continued

The Effect of Various Reactant Ratios and Reaction Conditions on the Products Properties and their Consequent Effect on the Properties of Drilling Mud Treated with 3 ppb of Additives

| | | | | |
|---|---|---|---|---|
| 33 | 01231 | 28 | 25 | 8.4 |
| 34 | 01231 | 28 | 22 | 8.3 |
| 35 | 01231 | 24 | 29 | 8.3 |

EXAMPLES 10-12

The same procedure of Example 1 was followed except that 2 moles of formaldehyde were used with 0.33 moles, 0.5 moles and 2.0 moles of urea, respectively, and 200 ml of hydrochloric acid, and the reaction continued for 60 minutes at reflux. The viscosity and solid content of the products along with their effect on the plastic viscosity (PV), yield point (YP) and filtration loss (FL) of a drilling mud are shown in Table 1.

EXAMPLES 13-20

The same procedure of Example 1 was followed except that 2 moles of formaldehyde were used with 0.33 moles of urea and 0.167 moles of sodium metabisulfite and phosphorous acid used were 0.0, 0.0625, 0.125, 0.250, 0.500, 1.00, 1.25 and 1.5 moles, respectively. The reaction continued for 60 minutes at reflux. The viscosity and solid content of the products along with their effect on the plastic viscosity (PV), yield point (YP) and filtration loss (FL) of a drilling mud are shown in Table 1.

EXAMPLES 21-24

The same procedure of Example 1 was followed except that 2 moles of formaldehyde were used with 0.33 moles of urea and 0.5 moles of phosphorous acid. Sodium metabisulfite used were 0.0, 0.0835, 0.167 and 0.330, respectively. The reaction continued for 60 minutes at reflux. The viscosity and solid content of the products along with their effect on the plastic viscosity (PV), yield point (YP) and filtration loss (FL) of a drilling mud are shown in Table 1.

EXAMPLES 25-27

The same procedure of Example 1 was followed except that 2 moles of formaldehyde were used with 25, 75 and 200 ml of hydrochloric acid (37% concentrated), respectively, and the reaction continued for 60 minutes at reflux. The viscosity and solid content of the products along with their effect on the plastic viscosity (PV), yield point (YP) and filtration loss (FL) of a drilling mud are shown in Table 1.

EXAMPLES 28-31

The same procedure of Example 1 was followed except that 2 moles of formaldehyde were used with 200 ml of hydrochloric acid of 37% concentrate and the reaction continued at reflux for 30, 60, 120 and 180 minutes, respectively. The viscosity and solid content of the products along with their effect on the plastic viscosity (PV), yield point (YP) and filtration loss (FL) of a drilling mud are shown in Table 1.

EXAMPLES 32-35

The same procedure of Example 1 was followed except that 2 moles of formaldehyde were used with 200 ml of hydrochloric acid of 37% concentrate and the reaction continued at reflux of 102.7° C., 104.5° C., 105.9° C. and 107.9° C. for 30, 60, 120 and 180 minutes, respectively. The viscosity and solid content of the products along with their effect on the plastic viscosity (PV), yield point (YP) and filtration loss (FL) of a drilling mud are shown in Table 1.

EXAMPLES 36-38

A reaction procedure similar to Example 1 was followed except that the order of adding the various reactants was reversed. A formaline solution was prepared by adding 62.5 gm of 96% paraformaldehyde (2 moles of formaldehyde) to a 120 ml of water at 60° C. This mixture was heated at 60° C. for 15 minutes. 75 ml of 37% hydrochloric acid was added and the temperature was raised to reflux. 20 gm of urea (0.33 moles) were then added and the reaction continued for 15 minutes at reflux. 31.67 gm of sodium metabisulfite (0.167 moles) were then added and the reaction continued for one hour. Finally, 165.7 gm of phosphorous acid (2 moles) were then added and the reaction continued at reflux for 60, 120 and 180 minutes, respectively. The products pH was raised to 8 to 10 by addition of sodium hydroxide. The products were then tested for their viscosity and solid content and their effect on drilling mud plastic viscosity (PV), yield point (YP) and filtration loss (FL). The results are shown in Table 2 along with the results obtained from Examples 4 through 9 that were prepared according to another procedure outlined in Example 1.

TABLE 2

Effect of Reaction Procedure on the Properties of These Products and their Consequent Effect on the Properties of Drilling Mud Treated with 3 ppb of These Additives

| | | Reactants | | | | | Phosphomethylolation | | Product Property | |
|---|---|---|---|---|---|---|---|---|---|---|
| Example No. | Lab Sample | Formaldehyde (moles) | Urea (moles) | Phosphorous Acid (moles) | HCl (ml) | Sodium meta bisulfite (moles) | Reaction Temp. (°C.) | Reaction Time (min) | Viscosity at 25° C. (cP) | Solid content (%) |
| 0 | Control | — | — | — | — | — | — | — | — | — |
| 4 | 0191 | 2.0 | 0.50 | 2.0 | 75 | 0.0 | 102 | 60 | 4.00 | 27.90 |
| 5 | 0191 | 2.0 | 0.50 | 2.0 | 75 | 0.0 | 102 | 120 | 4.87 | 30.70 |
| 6 | 0191 | 2.0 | 0.50 | 2.0 | 75 | 0.0 | 102 | 180 | 5.95 | 32.2 |
| 7 | 01101 | 4.0 | 0.50 | 2.0 | 75 | 0.0 | 102 | 60 | 4.42 | 28.1 |
| 8 | 01101 | 4.0 | 0.50 | 2.0 | 75 | 0.0 | 102 | 120 | 5.13 | 31.72 |
| 9 | 01101 | 4.0 | 0.50 | 2.0 | 75 | 0.0 | 102 | 180 | 5.94 | 34.9 |
| 36 | 11232 | 2.0 | 0.33 | 2.0 | 75 | 0.167 | 102 | 60 | 6.95 | 35.8 |

TABLE 2-continued

Effect of Reaction Procedure on the Properties of These Products and their Consequent Effect on the Properties of Drilling Mud Treated with 3 ppb of These Additives

| | | | | | | | | | | |
|---|---|---|---|---|---|---|---|---|---|---|
| 37 | 11232 | 2.0 | 0.33 | 2.0 | 75 | 0.167 | 102 | 120 | 5.72 | 32.0 |
| 38 | 11232 | 2.0 | 0.33 | 2.0 | 75 | 0.167 | 102 | 180 | 15.82 | 40.0 |
| 39 | 10312 | 4.0 | 0.33 | 2.0 | 75 | 0.167 | 102 | 60 | 4.83 | 29.30 |
| 40 | 10312 | 4.0 | 0.33 | 2.0 | 75 | 0.167 | 102 | 120 | 5.10 | 31.10 |
| 41 | 10312 | 4.0 | 0.33 | 2.0 | 75 | 0.167 | 102 | 180 | 5.95 | 33.70 |

| | | Drilling Mud Properties | | | |
|---|---|---|---|---|---|
| Example No. | Lab Sample | Plastic Viscosity (cP) | Yield Point YP (lb/100 ft2) | Filtration Loss FL (ml) | Reaction Procedure |
| 0 | Control | 29 | 40 | 9.5 | Procedure I |
| 4 | 0191 | 24 | 24 | 8.2 | Urea is added to Solution of H3PO3, HCl and |
| 5 | 0191 | 25 | 24 | 8.0 | Water at reflux. Then formaline is added dropwise |
| 6 | 0191 | 24 | 24 | 8.3 | in 1 hr. Reaction continues for 30 min to 180 min. |
| 7 | 01101 | 29 | 22 | 8.2 | Examples 4 through 9. |
| 8 | 01101 | 29 | 21 | 8.2 | |
| 9 | 01101 | 28 | 23 | 7.9 | |
| 36 | 11232 | 26 | 26 | 8.6 | Procedure II |
| 37 | 11232 | 25 | 25 | 8.6 | Urea is added to a solution of formaline and HCl at |
| 38 | 11232 | 26 | 30 | 8.3 | reflux temperature. Then H3PO3 is added and |
| 39 | 10312 | 24 | 28 | 9.0 | reaction continues for 60 to 180 minutes. Examples |
| 40 | 10312 | 21 | 30 | 8.7 | 36 through 41. |
| 41 | 10312 | 21 | 27 | 8.5 | |

TABLE 3

Effect of Application Dose of Some of These Products on the Properties of Drilling Mud as Compared to an Available Commercial Product

| | | Reactants | | | | | Phosphomethylolation | |
|---|---|---|---|---|---|---|---|---|
| Example No. | Lab Sample | Formaldehyde (moles) | Urea (moles) | Phosphorous Acid (moles) | HCl (ml) | Sodium meta bisulfite (moles) | Reaction Temp. (°C.) | Reaction Time (min) |
| | Control | — | — | — | — | — | — | — |
| 39 | 10312 | 4.0 | 0.33 | 2.0 | 75 | 0.167 | 102 | 60 |
| 39 | 10312 | 4.0 | 0.33 | 2.0 | 75 | 0.167 | 102 | 60 |
| 39 | 10312 | 4.0 | 0.33 | 2.0 | 75 | 0.167 | 102 | 60 |
| 20 | 11201b | 2.0 | 0.33 | 1.50 | 75 | 0.167 | 102 | 60 |
| 20 | 11201b | 2.0 | 0.33 | 1.50 | 75 | 0.167 | 102 | 60 |
| 20 | 11201b | 2.0 | 0.33 | 1.50 | 75 | 0.167 | 102 | 60 |
| 27 | 0118lb | 2.0 | 0.50 | 2.0 | 200 | 0.0 | 102 | 60 |
| 27 | 0118lb | 2.0 | 0.50 | 2.0 | 200 | 0.0 | 102 | 60 |
| 27 | 0118lb | 2.0 | 0.50 | 2.0 | 200 | 0.0 | 102 | 60 |
| Spersene (Commercial) | | — | — | — | — | — | — | — |
| Spersene | | — | — | — | — | — | — | — |
| Spersene | | — | — | — | — | — | — | — |

| | | Product Property | | Drilling Mud Properties | | | |
|---|---|---|---|---|---|---|---|
| Example No. | Lab Sample | Viscosity at 25° C. (cP) | Solid content (%) | Plastic Viscosity (cP) | Yield Point YP (lb/100 ft2) | Filtration Loss FL (ml) | Dose (lb/barrel) |
| | Control | — | — | 25 | 42 | 9.5 | — |
| 39 | 10312 | 4.83 | 29.30 | 21 | 30 | 9.0 | 1.0 |
| 39 | 10312 | 4.83 | 29.30 | 18 | 32 | 8.7 | 3.0 |
| 39 | 10312 | 4.83 | 29.30 | 18 | 29 | 8.5 | 5.0 |
| 20 | 11201b | 4.69 | 30.94 | 24 | 27 | 8.8 | 1.0 |
| 20 | 11201b | 4.69 | 30.94 | 26 | 19 | 8.6 | 3.0 |
| 20 | 11201b | 4.69 | 30.94 | 25 | 19 | 7.8 | 5.0 |
| 27 | 0118lb | 5.11 | 31.14 | 26 | 26 | 8.2 | 1.0 |
| 27 | 0118lb | 5.11 | 31.14 | 25 | 26 | 8.2 | 3.0 |
| 27 | 0118lb | 5.11 | 31.14 | 22 | 23 | 8.0 | 5.0 |
| Spersene (Commercial) | | — | — | 25 | 23 | 8.9 | 1.0 |
| Spersene | | — | — | 21 | 20 | 7.9 | 3.0 |
| Spersene | | — | — | 23 | 14 | 6.4 | 5.0 |

EXAMPLES 39–41

The same procedure of Example 36 was followed except that 4 moles of formaldehyde were used. The reaction continued for 60, 120 and 180 minutes, respectively. The viscosity and solid content of the products along with their effect on the plastic viscosity (PV), yield point (YP) and filtration loss (FL) of a drilling mud are shown in Table 2.

EXAMPLE 42

The products obtained from Examples 20, 27 and 39 were tested along with a commercially available drilling mud additive which is lignosulfonate-based, known commercially as "Spersene." Doses of 1, 3 and 5 ppb of these additives were used and the results on plastic viscosity (PV), yield point (YP) and filtration loss (FL) of the treated drilling mud, which was prepared according to Example 1, are shown in Table 3.

EXAMPLE 43

The same procedure of Example 1 was followed except that 3 moles of formaldehyde were used with 3 moles of phosphorous acid. The reaction continued for 60 minutes. This product was tested along with products obtained from Examples 5, 39, 9, 29, 49 and 52 and two lignosulfonate-based products known as "Spersene" and a thermally stable product "XP-20." These additives were tested for thermal aging at a dose of 3 ppb. The treated drilling muds were thermally aged at 350° F. for 24 hours. The drilling mud plastic viscosity (PV), yield point (YP) and filtration loss (FL) were evaluated before and after aging. The results are shown in Table 4.

TABLE 4

Effect of Thermal Aging on the Properties of Drilling Mud Treated with Different Additives. Aging was at 350° F. for 24 hours and Dose of Additive is 3 ppb

| Example No. | Lab Sample | Reactants | | | | | Phosphomethylolation | | Product Property | |
|---|---|---|---|---|---|---|---|---|---|---|
| | | Formaldehyde (moles) | Urea (moles) | Phosphorous Acid (moles) | HCl (ml) | Sodium meta bi-sulfite (moles) | Reaction Temp. (°C.) | Reaction Time (min) | Viscosity at 25° C. (cP) | Solid content (%) |
| | Control | — | — | — | — | — | — | — | — | — |
| 39 | 10312 | 4.0 | 0.33 | 2.0 | 75 | 0.167 | 102 | 60 | 4.83 | 29.30 |
| 5 | 0191 | 2.0 | 0.50 | 2.0 | 75 | 0.0 | 102 | 120 | 4.87 | 30.70 |
| 43 | 01111 | 3.0 | 0.50 | 3.0 | 75 | 0.0 | 102 | 60 | 5.88 | 29.80 |
| 9 | 01101 | 4.0 | 0.50 | 2.0 | 75 | 0.0 | 102 | 180 | 5.94 | 34.90 |
| 29 | 01211 | 2.0 | 0.50 | 2.0 | 200 | 0.0 | 102 | 60 | 5.00 | 33.46 |
| 49 | 2062 | Sulfonated melamine-formaldehyde + | | | | | | | 4.50 | 20.00 |
| 52 | 2062 | $(NH_4)_2HPO_4$ (3% P) | | | | | | | — | — |
| Spersene (Commercial) | | — | — | — | — | — | — | — | — | — |
| XP-20 (Thermally Stabilized Commercial) | | — | — | — | — | — | — | — | — | — |

| Example No. | Lab Sample | Drilling Mud Properties | | | | | |
|---|---|---|---|---|---|---|---|
| | | Before Aging | | | After Aging | | |
| | | Plastic Viscosity PV (cP) | Yield Point YP (lb/100 ft$^2$) | Filtration Loss FL (ml) | PV (cp) | YP (lb/100 ft$^2$) | FL (ml) |
| | Control | 25 | 45 | 9.5 | 14 | 43 | 27 |
| 39 | 10312 | 25 | 21 | 8.4 | 23 | 8 | 20.1 |
| 5 | 0191 | 23 | 21 | 8.0 | 23 | 6 | 20 |
| 43 | 01111 | 25 | 20 | 7.8 | 25 | 6 | 20.8 |
| 9 | 01101 | 23 | 22 | 7.9 | 21 | 6 | 18.5 |
| 29 | 01211 | 24 | 19 | 7.8 | 19 | 3 | 18.2 |
| 49 | 2062 | 29 | 25 | 9.2 | 20 | 7 | 28.6 |
| 52 | 2062 | 24 | 25 | 8.4 | 20 | 10 | 23.0 |
| Spersene (Commercial) | | 23 | 20 | 7.6 | 20 | 1 | 26 |
| XP-20 (Thermally Stabilized Commercial) | | 28 | 32 | 7.5 | 22 | 9 | 21.4 |

EXAMPLE 44–48

The same procedure of Example 1 was followed except that 2 moles of formaldehyde were used with 2 moles of each of a phosphorous containing compound like: $NaH_2PO_4$, $NH_4H_2PO_4$, $(NH_4)_2HPO_4$, $P_2O_5$ and $H_3PO_4$, respectively, instead of phosphorous acid. The reaction continued for 60 minutes. The products obtained were then tested on the drilling mud prepared according to the procedure outlined in Example 1 and the results on the plastic viscosity (PV), yield point (YP) and filtration loss (FL) are shown in Table 5.

EXAMPLE 49–56 samples of sulfonated melamine formaldehyde (SMF) and sulfonated urea-melamine formaldehyde (SUMF) where urea is 60% were prepared in accordance with a procedure outlined in U.S. Pat. No. 4,677,159. Various phosphorous containing compounds like $NaH_2PO_4$, $NH_4H_2PO_4$ and $(NH_4)_2HPO_4$ were physically mixed with the SMF and SUMF resins where the percentage of phosphorous (P) was 3% by weight. The resulting samples were tested on the drilling mud formulation prepared according to the procedure outlined in Example 1. The plastic viscosity (PV), yield point (YP) and filtration loss (FL) of the treated drilling mud are shown in Table 5. Table 5 also shows the results of a product prepared according to Example 29 and a commercial product "Spersene" which is a lignosulfonate-based additive.

trated (15N) phosphorous acid and the reaction continued for one hour. In the fourth step, the pH was raised to 7 to 8 by the addition of sodium hydroxide and the temperature was raised to 80° C. and the reaction con-

TABLE 5

Effect of Phosphorous Containing Compounds on the Drilling Mud Properties When They are Physically Mixed With Sulfonated Amino Aldehyde Resins and When They Are Phosphomethylolated with Urea

| Example No. | Lab Sample | Composition | Plastic Viscosity PV (cP) | Yield Point YP (lb/100 ft$^2$) | Filtration Loss FL (ml) |
|---|---|---|---|---|---|
|  |  | Control | 25 | 36 | 9.5 |
| 49 | 2062 | SMF$^{(1)}$ | 22 | 34 | 8.0 |
| 50 | 2062 | SMF + NaH$_2$PO$_4$$^{(2)}$ | 20 | 34 | 7.6 |
| 51 | 2062 | SMF + NH$_4$H$_2$PO$_4$$^{(2)}$ | 21 | 33 | 7.8 |
| 52 | 2062 | SMF + (NH$_4$)$_2$H$_2$PO$_4$$^{(2)}$ | 20 | 30 | 8.4 |
| 53 | 1262 | SUMF$^{(3)}$ | 21 | 30 | 9.2 |
| 54 | 1262 | SUMF + NaH$_2$PO$_4$$^{(2)}$ | 26 | 28 | 8.1 |
| 55 | 1262 | SUMF + NH$_4$H$_2$PO$_4$$^{(2)}$ | 22 | 35 | 8.1 |
| 56 | 1262 | SUMF + (NH$_4$)$_2$H$_2$PO$_4$$^{(2)}$ | 24 | 31 | 8.6 |
| 57 | 1031 | SMF with H$_3$PO$_3$$^{(2)}$ | 22 | 32 | 9.7 |
| 58 | 10302 | SUF with H$_3$PO$_3$$^{(2)}$ | 21 | 34 | 10.7 |
| 44 | 11133 | PUF with NaH$_2$PO$_4$$^{(4)}$ | 16 | 40 | 9.7 |
| 45 | 11123 | PUF with NH$_4$H$_2$PO$_4$$^{(4)}$ | 24 | 27 | 9.2 |
| 46 | 11124 | PUF with (NH$_4$)$_2$HPO$_4$$^{(4)}$ | 24 | 28 | 10.1 |
| 47 | 1251 | PUF with P$_2$O$_5$$^{(4)}$ | 23 | 34 | 10.1 |
| 48 | 1241 | PUF with H$_3$PO$_4$$^{(4)}$ | 27 | 27 | 8.9 |
| 29 | 01211 | PUF with H$_3$PO$_3$$^{(4)}$ | 23 | 21 | 7.8 |
| Spersene (Commercial) |  | lignosulfonate | 21 | 18 | 7.9 |

$^{(1)}$SMF and SUF are sulfonated melamine formaldehyde and sulfonated urea formaldehyde resins respectively.
$^{(2)}$Various P-containing compounds were physically mixed @ 3% P
$^{(3)}$SUMF is sulfonated urea melamine formaldehyde resin.
$^{(4)}$PUF is phosphorylated urea formaldehyde. The various P-containing compounds are reacted with urea and formaldehyde according to procedure outline in this invention.
*Dose of additive used was 3 ppb.

EXAMPLES 57–58

Sulfonated melamine formaldehyde (SMF) and sulfonated urea formaldehyde (SUF) were prepared according to a procedure outlined in U.S. Pat. No. 4,677,159 except that in the third step of this preparation, which is a low pH condensation step, phosphorous acid was used instead of the normal sulfuric acid. More specifically, 49.6 gm of 96% paraformaldehyde were dissolved in 320 gm of water and the solution was heated up to 50° C. and continue heating for 30 minutes at a pH of 10.5 to 11.0. Then 50.0 gm of melamine (Example 57) or 23.81 gm of urea (Example 58) were added with 160 gm of water and the reaction mixture continued for 15 minutes at 50° C. and pH of 10.5 to 11.0. After the solution became clear, 37.7 gm of sodium metabisulfite and 150 gm of water were added and the temperature of the reaction was raised to 80° C. and the reaction continued for one hour. In the third step, the temperature of the reaction mixture was dropped to 50° C. and the pH was dropped down to 4.0 by the addition of concentrated (15N) phosphorous acid and the reaction continued for one hour. Finally, the solution was filtered and its viscosity and solid content was measured. The percent of phosphorous (P) in the final product was measured to be 2.34% for SMF (Example 57) and 1.67% for SUF (Example 58) resins. The effect of these products on plastic viscosity (PV), yield point (YP) and filtration loss (FL) of the drilling mud prepared according to the procedure outlined in Example 1 were measured and are shown in Table 5.

EXAMPLES 59–70

The same procedure of Example 16 was followed except that 75 ml, 200 ml and 300 ml of acetic acid were used instead of hydrochloric acid. The reaction continued at reflux for 30, 60, 120 and 180 minutes, respectively. The viscosity and solid content of these products along with their effect on the plastic viscosity (PV), yield point (YP) and filtration loss (FL) of a drilling mud are shown in Table 6. Example 16 and Examples 28 to 31, where hydrochloric acid was used, are also shown for comparative purposes.

TABLE 6

Effect of Acetic Acid on the Behavior of These Resins Compared to Hydrochloric Acid. The dose used is 3 ppb

| Example No. | Lab Sample | Reactants | | | | | Phosphomethylolation | | Product Property | | Drilling Mud Properties | | |
|---|---|---|---|---|---|---|---|---|---|---|---|---|---|
| | | Formaldehyde (moles) | Urea (moles) | Phosphorous Acid (moles) | Acid (ml) | Sodium meta bisulfite (moles) | Reaction Temp. (°C.) | Reaction Time (min) | Viscosity at 25° C. (cP) | Solid content (%) | Plastic Viscosity (cP) | Yield Point YP (lb/100 ft2) | Filtration Loss FL (ml) |
| | Control | — | — | — | — | — | — | — | — | — | 29 | 40 | 9.5 |
| 59 | 11221a | 2.0 | 0.33 | 0.25 | 75 | 0.167 | 102 | 30 | 5.5 | 36.6 | 27 | 33 | 10.6 |
| 60 | 11221b | 2.0 | 0.33 | 0.25 | 75 | 0.167 | 102 | 60 | 3.24 | 31.2 | 28 | 30 | 10.2 |
| 61 | 11221c | 2.0 | 0.33 | 0.25 | 75 | 0.167 | 102 | 180 | 3.32 | 31.9 | 27 | 29 | 10.4 |
| 62 | 11221d | 2.0 | 0.33 | 0.25 | 75 | 0.167 | 102 | 180 | 3.52 | 32.1 | 28 | 34 | 10.0 |

TABLE 6-continued

Effect of Acetic Acid on the Behavior of These Resins Compared to Hydrochloric Acid. The dose used is 3 ppb

| Example No. | Lab Sample | Reactants | | | | | Phosphomethylolation | | Product Property | | Drilling Mud Properties | | |
|---|---|---|---|---|---|---|---|---|---|---|---|---|---|
| | | Formaldehyde (moles) | Urea (moles) | Phosphorous Acid (moles) | Acid (ml) | Sodium meta bisulfite (moles) | Reaction Temp. (°C.) | Reaction Time (min) | Viscosity at 25° C. (cP) | Solid content (%) | Plastic Viscosity (cP) | Yield Point YP (lb/100 ft2) | Filtration Loss FL (ml) |
| 63 | 0241a | 2.0 | 0.5 | 2.0 | 200 | 0.0 | 102 | 30 | 8.37 | 40.3 | 27 | 25 | 9.4 |
| 64 | 0241b | 2.0 | 0.5 | 2.0 | 200 | 0.0 | 102 | 60 | 9.43 | 47.8 | 26 | 26 | 8.6 |
| 65 | 0241c | 2.0 | 0.5 | 2.0 | 200 | 0.0 | 102 | 120 | 10.40 | 47.3 | 27 | 28 | 8.7 |
| 66 | 0241d | 2.0 | 0.5 | 2.0 | 200 | 0.0 | 102 | 180 | 12.34 | 50.8 | 28 | 28 | 8.4 |
| 67 | 0281a | 2.0 | 0.5 | 2.0 | 300 | 0.0 | 102 | 30 | 10.89 | 44.8 | 25 | 29 | 9.0 |
| 68 | 0281b | 2.0 | 0.5 | 2.0 | 300 | 0.0 | 102 | 60 | 14.41 | 43.3 | 28 | 22 | 8.6 |
| 69 | 0281c | 2.0 | 0.5 | 2.0 | 300 | 0.0 | 102 | 120 | 17.00 | 50.4 | 28 | 22 | 8.8 |
| 70 | 0281d | 2.0 | 0.5 | 2.0 | 300 | 0.0 | 102 | 180 | 17.78 | 51.2 | 27 | 24 | 8.6 |
| 28 | 0211a | 2.0 | 0.5 | 2.0 | 200 | 0.0 | 102 | 30 | 4.64 | 31.0 | 26 | 22 | 8.9 |
| 29 | 0211b | 2.0 | 0.5 | 2.0 | 200 | 0.0 | 102 | 60 | 5.00 | 32.5 | 26 | 24 | 7.8 |
| 30 | 0211c | 2.0 | 0.5 | 2.0 | 200 | 0.0 | 102 | 120 | 5.85 | 34.5 | 27 | 26 | 8.3 |
| 31 | 0211d | 2.0 | 0.5 | 2.0 | 200 | 0.0 | 102 | 180 | 5.79 | 36.3 | 25 | 26 | 8.7 |

*Acetic acid is used in examples 59 to 70 while hydrochloric acid is used in examples 16 and 28 to 31.

Example 71

Samples of Examples 7, 25, 39, 43 and 49 were tested for their dispersion abilities as soil stabilizers. Table 7 shows that when 1% of these additives (based on weight of additive to weight of sand) is mixed with sand, the compressive strength of sand improves. However, Table 7 shows very clearly that sulfonated melamine formaldehyde are far superior than phosphomethylated urea as soil stabilizers.

EXAMPLE 72

Samples of Examples 18, 19, 23, 39, 48, 57 and 58 were freeze-dried. The solid product obtained was analyzed for the various elements. Table 8 shows the percentages of P, N, C, H, S and Na in these products.

TABLE 7

Effect of Some of These Products on the Compressive Strength of Sand.

| Example No. | Sample (Lab) | Compressive Strength of Sand* (kg/cm²) |
|---|---|---|
| | Control | 10.78 |
| 43 | 01111 | 13.18 |
| 25 | 01171 | 13.05 |
| 7 | 01101 | 12.14 |
| 39 | 10312 | 11.74 |
| 49 | 2062 | 19.75 |

*1% of stabilization (i.e., weight of additives to weight of sand) and curing conditions of sand samples cubes were at 70° C. for 24 hours.

TABLE 8

Chemical Composition of Some Prepared Resins

| Example | Lab Sample | Chemical Composition | | | | | |
|---|---|---|---|---|---|---|---|
| | | % P | % N | % C | % H | % S | % Na |
| 18 | 1152 | 9.67 | 3.08 | 4.79 | 3.17 | 1.26 | 19.1 |
| 19 | 11201a | 10.74 | 2.87 | 6.39 | 3.84 | 1.37 | 21.6 |
| 23 | 11122 | 7.89 | 4.94 | 7.78 | 3.48 | 2.07 | 21.4 |
| 39 | 10312 | 12.70 | 1.50 | 6.50 | 3.70 | 0.94 | 24.5 |
| 48 | 1241 | 14.23 | 2.05 | 7.68 | 2.35 | 1.30 | 25.9 |
| 57 | 1031 | 2.34 | 19.90 | 20.40 | 6.20 | 6.62 | 10.0 |
| 58 | 10302 | 1.67 | 8.80 | 17.10 | 5.60 | 9.24 | 11.6 |

While the invention has been described in connection with certain preferred embodiments, it is not intended to limit the invention to the particular forms set forth, but it is intended to cover such alternatives, modifications and equivalents as defined by the appended claims.

What is claimed is:

1. A drilling fluid additive prepared by a process which includes the following steps:
   (a) dissolving from about 0.0625 to about 3 moles of a compound selected from the group consisting of phosphorous acid, sodium dihydrogen orthophosphate, ammonium dihydrogen orthophosphate, phosphorous pentaoxide, phosphoric acid and mixtures thereof in water and adding from about 0.25 to about 5.00 moles of an acid selected from the group consisting of hydrochloric acid and acetic acid to form a solution with a pH of between about +0.3 to −1.0, heating the solution to 100° C. to 110° C. and maintaining the solution at that temperature for about 15 to about 30 minutes;
   (b) adding about 0.25 to about 2.0 moles of a compound selected from the group consisting of urea, melamine and mixtures thereof to the solution of step (a), and refluxing within the aforementioned temperature range for about 15 to about 30 minutes;
   (c) dissolving between about 1.0 to about 4 moles of paraformaldehyde in water;
   (d) mixing the formaline solution prepared in step (c) to the refluxed solution from step (b);
   (e) maintaining the reflux temperature for about 30 minutes to about 180 minutes; and
   (f) adjusting the pH of the solution obtained from step (e) to about 8 to about 10 and filtering the solution to thereby obtain a solution having a viscosity of between 1.5 and 13 centipoise when measured at 25° C. and a solid content between about 20% to about 55%.

2. A process for preparing a drilling fluid additive comprising the following steps:
   (a) dissolving from about 0.0625 to about 3 moles of phosphorous acid in water and adding from about 0.25 to about 3.0 moles of concentrated hydrochloric acid to form a solution with a pH of between about +0.3 to −1.0, heating the solution to 100° C. to 110° C. and maintaining the solution at that temperature for about 15 to about 50 minutes;
   (b) adding about 0.25 to about 2.0 moles of a material selected from the group consisting of urea, melamine and mixtures thereof to the solution of step (a), and refluxing within the aforementioned temperature range for about 15 to about 30 minutes;

(c) dissolving between about 1.0 to about 4 moles of paraformaldehyde in water;

(d) mixing the formaline solution prepared in step (c) to the refluxed solution from step (b);

(e) maintaining the reflux temperature for about 30 minutes to about 180 minutes; and (f) adjusting the pH of the solution obtained from step (e) to about 8 to about 10 and filtering the solution to thereby obtain a solution having a viscosity of between 1.5 and 13 centipoise when measured at 25° C. and a solid content between about 20% to about 55%.

3. A process for preparing a drilling fluid additive comprising the following steps:

(a) dissolving from 1.25 to 2.5 moles of 99% pure phosphorous acid in water and adding from 1.0 to 2.5 moles of 37% concentrated hydrochloric acid to form a solution with a pH of between +0.3 to −1.0, heating the solution to a temperature of between 100° C. to 110° C. and refluxing the solution at that temperature for a period of 15 to 30 minutes;

(b) adding from 0.33 to 0.5 moles of a material selected from the group consisting of urea and melamine to the solution of step (a) and refluxing the resulting solution for an additional 15 to 30 minutes;

(c) dissolving from 1.25 to 2.5 moles of 96% paraformaldehyde in water to form a solution;

(d) adding the solution prepared in step (c) dropwise over the course of about one hour to the solution of step (b);

(e) refluxing the solution from step (d) at 100° C. to 110° C. for 30 to 180 minutes; and (f) adjusting the pH of the solution obtained from step (e) to about 8 to about 10 by the addition of sodium hydroxide and filtering the solution to thereby obtain a solution having a viscosity of between 1.5 and 13 centipoise when measured at 25° C., and a solid content between 20% to 55%.

4. A process for preparing a drilling fluid additive comprising the following steps:

(a) dissolving about 5 to 165.7 parts by weight of 99% purity phosphorous acid in 50 to 350 parts of water and 30 to 260 parts of 37% concentrated hydrochloric acid and heating the solution to 100° C. to 110° C. and refluxing the solution at that temperature for 15 to 30 minutes to thereby form a solution with a pH of about +0.3 to −1.0;

(b) adding about 20 to 120 parts by weight of a material selected from the group consisting of urea and melamine to the solution prepared in step (a) and continuing the reaction under reflux conditions at 100° C. to 110° C. for 15 to 30 minutes;

(c) preparing a formaline solution by dissolving 31 to 124 parts by weight of 96% paraformaldehyde in 230 to 400 parts of water at 60° C. over a period of 15 to 30 minutes;

(d) adding the solution prepared in step (c) dropwise over the course of one hour to the solution in step (b) while refluxing at 100° C. to 110° C;

(e) continuing the reaction in step (d) by refluxing at 100° C. to 110° C. for 30 to 180 minutes; and (f) adjusting the pH of the solution obtained in step (e) to 8 to 10 by the addition of sodium hydroxide and filtering to thereby obtain a solution with a viscosity that ranges between 1.5 and 13 centipoise when measured at 25° C. and a solid content ranging from about 20% to 55%.

5. A process for preparing a drilling fluid additive according to claim 3 in which the ratio of urea or melamine to phosphorous acid to formaldehyde is 0.5:2.0:2.0:.

* * * * *